Sheet 1, 2 Sheets.
W. E. Nichols.
Cord & Rope Mach.
No. 423. Reissued Jan. 20, 1857.
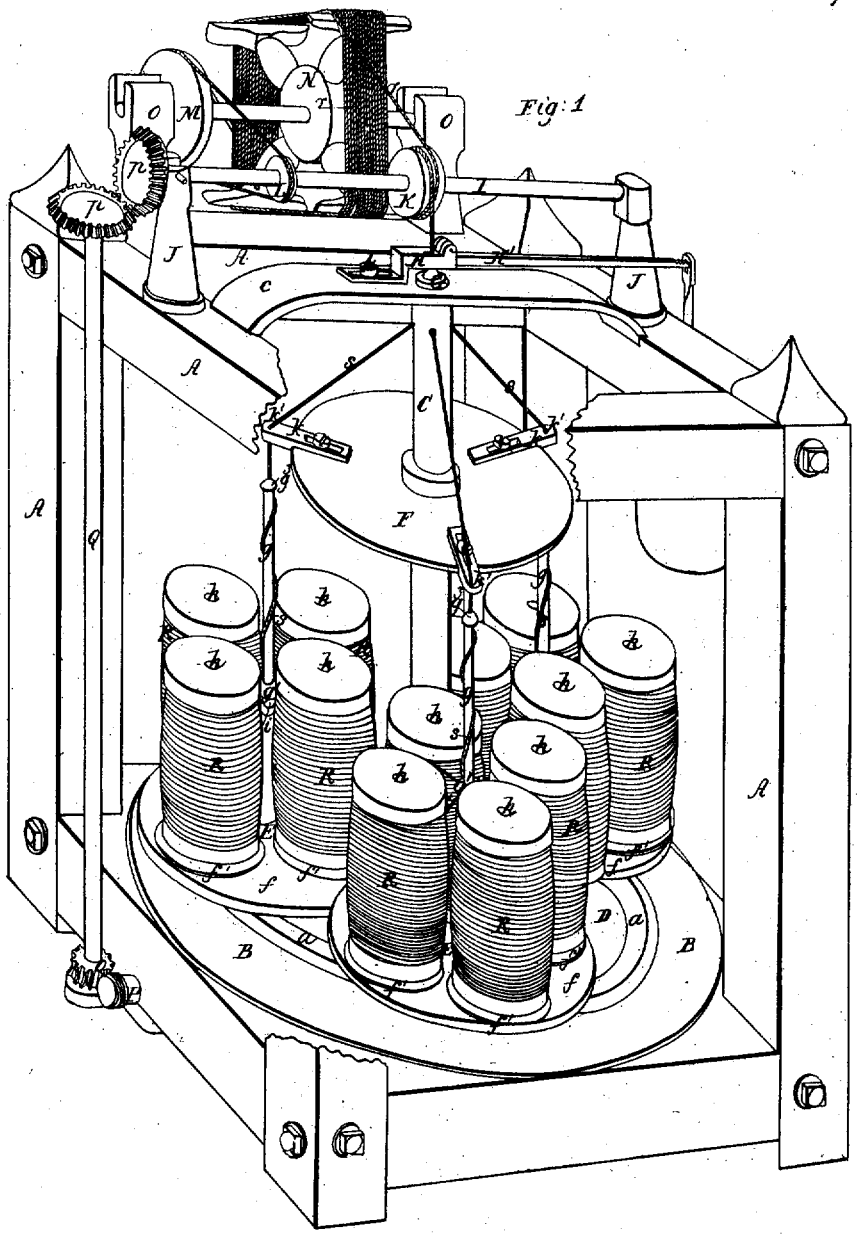
THE NORRIS PETERS CO., WASHINGTON, D. C.

Sheet 2, 2 Sheets.
W. E. Nichols.
Cord & Rope Mach.
No. 423.
Fig. 2. Reissued Jan. 20, 1857.
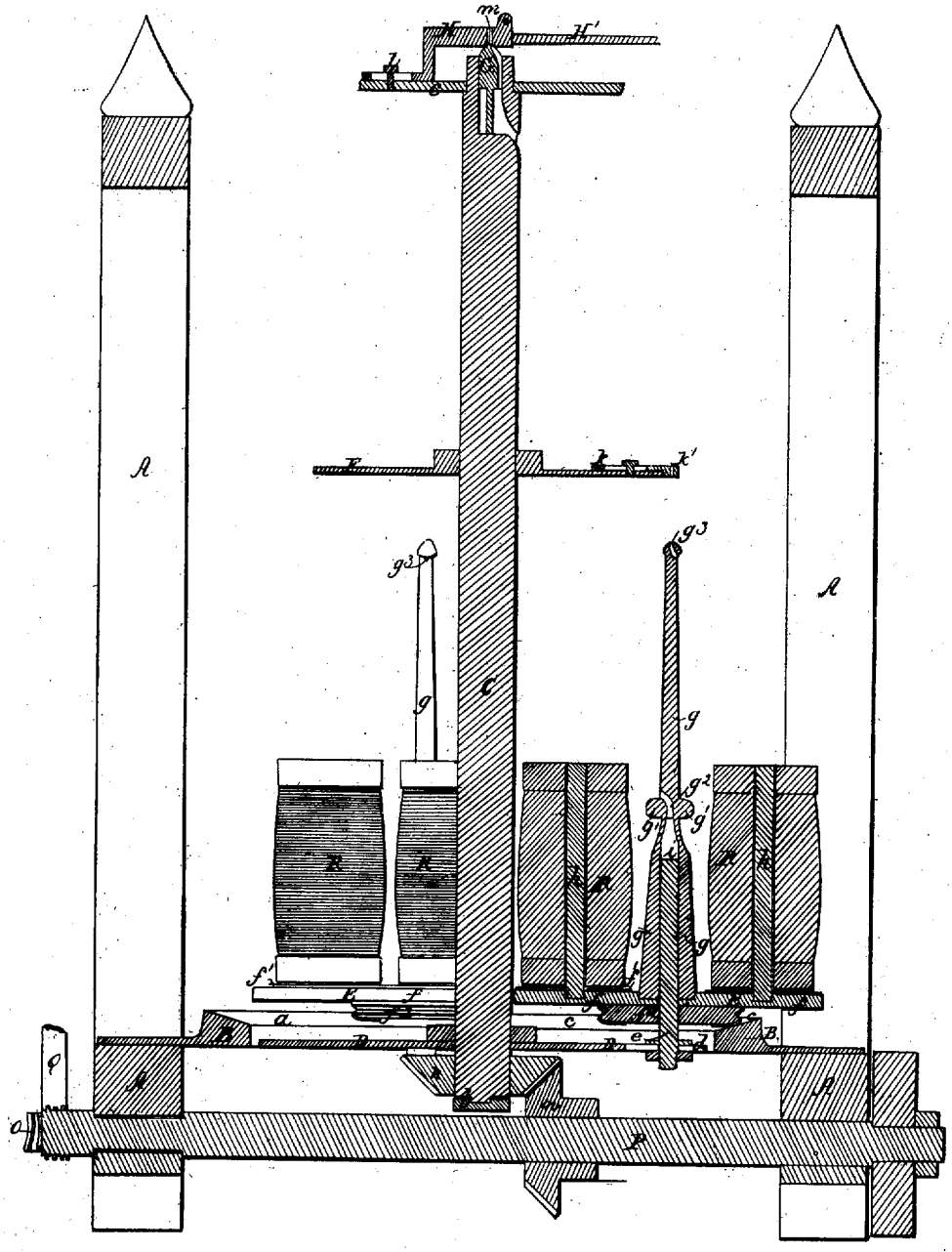
THE NORRIS PETERS CO., WASHINGTON, D. C.

UNITED STATES PATENT OFFICE.

WILLIAM E. NICHOLS, OF EAST HADDAM, CONNECTICUT.

IMPROVEMENT IN MACHINERY FOR MAKING CORD.

Specification forming part of Letters Patent No. 6,942, dated December 11, 1849; Reissue No. 123, dated January 20, 1857.

*To all whom it may concern:*

Be it known that I, WILLIAM E. NICHOLS, of East Haddam, in the county of Middlesex and State of Connecticut, have invented certian new and useful improvements in machinery for the manufacture of all kinds of twisted cords and ropes, but more particularly applicable to making cotton twine, of which the following is a full, clear, and exact description, reference being had to the annexed drawings of the same, making part of this specification, in which—

Figure 1 is a perspective view, wherein a portion of the frame is removed for the sake of perspicuity; and Fig. 2 is a vertical section through the center of the upright shaft.

My invention and improvements relate to the manner in which the bobbin-frames are turned on their own axes to twist the yarns from the bobbins, which they respectively carry, into strands, while at the same time they are carried round a common center to twist the strands into a cord. The manner in which the relative amount of twist given to the cord and the individual strands of which it is composed can be varied at will, and the manner of laying the yarns of the strands.

In the accompanying drawings the principal frame A, on which the several parts of the machine are mounted, is of a rectangular form, made of wood, and its parts secured together by joint-bolts. It may, however, be made of any suitable form and material. Upon the lower part of the frame a metal ring, B, is secured in a horizontal position, whose upper side is inclined down and inward, so as to form an inclined annular surface or track, *a*, of considerable width, for the pulleys which carry the bobbin-frames to roll on. In the center of this ring an upright revolving shaft, C, is secured, its lower end resting in a step, *b*, on one of the lower cross-bars of the frame, and its upper end, on which the laying-top is formed, passing through an upright bearing in a bridge, *c*, across the top of the frame. A platform, D, is secured upon the lower part of the shaft C in such a position that its upper surface will be somewhat below the inner edge of the inclined surface *a* of the ring B. In this platform a series of equidistant radial slots, *d*, are formed, in each of which an upright pivot, *e*, is secured by a clamp screw, that it may be adjusted at different distances from the shaft C. These pivots drive and keep in the proper position the bobbin-frame E, whose hollow axes are made to fit upon them, but not so tightly as to prevent their sliding up or down and turning freely.

The bobbin-frames consist of a platform, *f*, surmounted by an upright central stem, *g*, and a series of upright equidistant bobbin-spindles, *h*, arranged in a circle concentric with the stem, the surface of the platform *f* around the base of each spindle being covered with leather, *f*, to increase the friction on the end of the bobbin-spools resting thereon, and thereby prevent the thread from unwinding too fast. Each platform *f* has a pulley, $f^2$, formed on its under side concentric with its stem, the pulley having a groove on its periphery to receive an endless cord, which may pass round the pulleys of all the platforms to equalize the relative motion. The lower sides of the pulleys $f^2$ are rounded off on the outer edges and covered with leather to increase their adhesion to the surface *a* of the ring B, on which they respectively rest, and support the weight of the bobbin-frames E, which are held in an upright position and at the proper distance from the shaft C by the pivots *e*. It is obvious that this wheel or pulley (shown as making the lower part of pulley *f*) may be entirely separate therefrom, and be held by well-known means concentrically with the spindle *g* and opposite any desired point thereof, the position of the surface on which it travels being adapted thereto. The lower part of the stem *g* is enlarged and its axis made hollow to receive the upper part of the pivot *e*. The upper end of the enlarged portion of the stem has a collar, *g'*, surrounding it, beneath which one or more transverse openings, *i*, are made through it, according to the number of bobbins whose yarn is intended to be laid into each strand. From the upper side of the collar *g'* a perforation, $g^2$, is made obliquely downward, which terminates in the opening *i* at the axis of the stem. From the center of the top of the stem a perforation is made obliquely downward, terminating at the periphery a short distance below the top. All these perforations and openings in the stem must have the angles of their orifices rounded off and made smooth to prevent the threads or strands from being abraded. A short distance above the level of the tops of the stems *g* a disk, F, is secured to the shaft C, having a series of equidistant radial arms, *k*, one of which projects over each stem, so that an eye, *k'*, in its outer end will be immediately above the orifice in the top of the stem. The arms *k* are adjustable, so that their position may be changed to correspond with the changes in the position of the stem *g*, caused by the adjustment of the bobbin-frames for the purpose of varying their speed. The upper end of the shaft C has a laying-top, G, formed on it of the usual construction, above the apex of which is a tube, *m*, for the laid cord to pass through, and which is capable of expansion and contraction. This tube is composed of two parts, one half being formed in the end of the block H, the other in the end of the lever H', hinged thereto. The block H is held in position by a clamp screw, *l*, passing through a slot in its outer end into the bridge *c*. This arrangement admits of the adjustment of the block nearer to or farther from the apex of the top G to adapt the tube *m* to the compression of a smaller or larger cord. It likewise admits of the turning of the block on the clamp-screw *l* as its hinge to move the tube to one side of the top to rethread the strands through the latter in case of their being accidentally broken, which sometimes occurs. When the outer end or long arm of the lever H' is raised, the tube *m* is expanded, and when it is depressed the tube is contracted. To contract the tube *m* with the requisite force upon the cord, to condense, smooth, and give it a cylindrical form and retard its passage by friction, so that the tension to which it is subjected in being drawn through by the reel will thoroughly stretch it, a weight must be hung upon the lever H' at a greater or less distance from its fulcrum as the pressure required is greater or less. Across the top of the frame a shaft, I, is supported by boxes in the standards J. On the middle of this shaft a sheave, K, is secured, a tangent line from the periphery of the bottom of the groove of which coincides with the axis of the tube *m* and shaft C, so that the cord when wound round this sheave may be drawn by it vertically through the compressing-tube *m*. Another sheave, L, is secured upon the shaft I to drive a corresponding sheave, M, on the axle of the reel N.

The reel is constructed in the usual manner, its axis being supported in suitable bearings in the standards O, which project up from the back of the frame A. Motion is communicated to the upright shaft C from the horizontal shaft P through the medium of a pair of bevel-wheels, *n*, one of which is secured to the lower end of the shaft C, and the other to the shaft P. The shaft I likewise derives motion from the horizontal shaft P through the medium of an upright shaft, Q, supported in suitable bearings in the side of the frame A, the shaft Q having a worm-wheel, *o*, on its lower end, which gears into an endless screw on the shaft P, and on its upper end a bevel-wheel, *p*, which gears into a similar bevel-wheel on the shaft I. The reel is turned by a band driven by the sheave L, and should have a tendency to turn somewhat faster than the cord is supplied to it for the purpose of keeping it stretched as it winds it up. The main driving-shaft P is put in motion by steam or other power, as may be found most convenient, and this motion may be transmitted to the several parts just described in various ways, some of which may, under certain circumstances, be preferable to others; but these variations must be left to the judgment of the constructor. A series of these machines may likewise be put in motion by belts from one line-shaft, but this arrangement need only be mentioned to be understood by a machinist.

The bobbins R of yarn are prepared by spinning machinery in the usual manner and transferred from the spinning-frames to the spindles *h* of the bobbin-frames E. Four bobbins are shown on each frame, but more or less than this number may be used as the number of yarns in the strand are required to be increased or diminished. Three bobbin-frames only are represented, but they must be as numerous as the strands required to be twisted and laid into one cord. The yarns are passed from the bobbins into the orifices *i* of the stems *g*, and thence through the tube $g^2$, where they all combine to fo m the strand *s*, which is then wound once or more times round the upper part of the stem, and then passed through the tube $g^3$ and out at its top, and through the eye *k'* of the arm *k*, and thence through the converging tubes of the laying-top G, where all the strands from the several bobbin-frames meet and are laid together to form the cord *r*, which then passes up through the compressing-tube *m* to the sheave *k*, round which it is wound several times to prevent slipping, and thence carried to the reel N, upon which it is wound as fast as it is finished.

It is obvious that my principle of giving revolution to the frames while laying the cord is equally applicable whether said frames are filled with bobbins of yarns, cans of roving, or a single bobbin containing the strand previously made. The bobbins, yarns, and strands being thus arranged, and all the parts of the machine in order, the shaft P is put in motion, which turns the upright shaft C in the direction indicated by the arrow, carrying round with it the platform D, whose adjustable pivots *e* drive the bobbin-frames E round the inclined surface *a* of the ring B, on which their pulleys $f^2$ rest, and the friction against which causing the pulleys to roll, the bobbin frames E will be rotated on their own axes at the same time they are carried round the axis of the shaft C by the platform D. By adjusting the pivots, wheel or pulley *f*, which drives the bobbin-frames at a greater distance from the shaft C, the circumference of the track on the ring over which the pulleys run will be increased, and they will have to roll over and over a proportionately greater number of times to pass over it. By lessening this distance between the pivots and the shaft the track of the pulleys would be shortened, and they would consequently have to rotate round their own axes a less number of times in rolling once over it. In this manner the relative number of the revolutions which each of the bobbin-frames E and the shaft C, respectively, perform may be changed at will with the greatest nicety, and with but little trouble or difficulty, which is a feature of much importance as respects the twisting of cotton cordage, where the strands should be twisted as much as the strength of the fiber will admit of. This method of driving the bobbin-frames is far preferable to any arrangement that has previously been adopted for the purpose, whether by cog-wheels, belts and pulleys, or the rolling of pulleys on a yielding track. It takes much less power to drive them, is more durable, they run more smoothly and noiselessly, and give a more uniform twist to the strand, and by reason of the absence of jerks and jarring in their motion, admit of more twist being put into the strand than can be done when they are otherwise driven. The twist is given to the strands by the turning of the stems or spindles on which the yarns of which they are constituted are laid. The twist of the strand should in general be the contrary way from the twist of the individual yarns. In laying the yarns into the strand a very important office is performed by the upper portion of the stem *g*, the friction between whose surface and the strand wound round it admits of the necessary tension being given to the strand to give it a hard twist without unwinding the yarn too fast from the bobbin. It likewise prevents the twist from extending to the yarns individually below the tube $g^2$, which would entangle them with the yarn on the bobbin and prevent it from being unwound with regularity. It also makes the tension and twist proportionate to each other, the greatest tension being at the top of the stem when the twist is the greatest, while both the twist and the tension gradually diminish in approaching toward the collar $g'$, being exhausted by friction where the former ceases and the latter exists with barely sufficient force to unwind the yarn from the bobbins. This gradual and proportional twisting and tension prevents the threads from overlying each other, lays them regularly and evenly side by side, and makes a smooth and even strand, without which it is impossible to make smooth and even cord. The friction of the strands on all the stems being the same, the relative tension of all the strands is the same, which causes them to be laid into the cord with a degree of evenness and regularity otherwise unattainable. On the laying-top G all the strands meet and are twisted together to form the cord by the rotation of the shaft C, the twisting of the cord being the contrary way from the twist of its individual strands, it takes out from them a portion of what was given to them by the stems *g* of the bobbin-frames, and as the good quality of all cordage, but cotton twines especially, is in a great degree proportioned to the hardness of its own proper twist and that of its strands, everything which tends to render the strands capable of bearing an increase of twist, where, in the first instance, it must of necessity be in excess, is of vital importance to the manufacturer. The cord as soon as laid passes directly into the compressing-tube *m*, which grips it with such a degree of force as will smooth down any irregularities and prevent it from being drawn forward to the reel by the sheave K without subjecting it to all the tension it will bear without injury to its strength. In this manner all the cord is uniformly and thoroughly stretched as fast as it is made, which gives it increased value for any purpose which it may be used for, but especially for seines and other purposes connected with fisheries.

It is quite obvious that a great variety of minor modifications can be made in every part of the structure and arrangement of the mechanism before described without in any degree changing the principle on which it operates, and such modifications may even be advisable to adapt it to the performance of different kinds of and qualities of work; but these modifications would be so readily comprehended by and so obvious to any competent mechanician conversant with the structure and operation of such machinery that a particular description of them is deemed unnecessary.

What I claim in the foregoing as my invention, and desire to secure by Letters Patent, is—

1. Twisting or controlling the twist of the strands while the main frame is revolving to lay them into cord by causing an even-faced wheel attached concentrically to and revolving with the bobbin-frame to travel over a fixed and smooth surface, friction causing the frame to revolve.

2. Revolving the bobbin-frames on their own axes to twist the strands, at the same time that they are carried round a common center to twist the cord, by rolling them on the surface of a stationary annular inclined track, toward the inner or outer periphery of which they can be adjusted to run, so as to vary the relative twist of the strands and cords, substantially as herein set forth; but I make no claim to the mere turning of the bobbin-frames by friction by any of the devices usually employed for similar purposes.

3. The construction and arrangement of the central stem or spindle of the bobbin-frame, operating substantially as herein set forth, whereby the yarns are collectively subjected to progressively increasing tension and twist from the commencement to the end of the process of laying them into the strand, whereby the latter is rendered smooth and regular in its figure and of uniform density and strength, and subjected to uniform tension while being laid into the cord.

WILLIAM E. NICHOLS.

In presence of—
W. P. N. FITZGERALD,
JOHN J. MURRAY.